(12) United States Patent
Finnestad

(10) Patent No.: US 6,412,783 B1
(45) Date of Patent: Jul. 2, 2002

(54) SELF ALIGNING STUFFING BOX FOR PUMPJACKS

(76) Inventor: Scott Finnestad, 72 Parsons Cl., Red Deer, Alberta (CA), T4P 2C8

( * ) Notice: Subject to any disclaimer, the term of this patent is extended or adjusted under 35 U.S.C. 154(b) by 30 days.

(21) Appl. No.: 09/670,415

(22) Filed: Sep. 26, 2000

(30) Foreign Application Priority Data

Sep. 28, 1999 (CA) .......................................... 2283978

(51) Int. Cl.[7] ................................................ F16J 15/18
(52) U.S. Cl. ...................... 277/329; 277/518; 277/520; 166/84.1
(58) Field of Search ................................ 277/323, 329, 277/511, 518, 519, 520, 521; 166/387, 85.5, 80.1, 84.1, 241.1

(56) References Cited

U.S. PATENT DOCUMENTS

| | | | | |
|---|---|---|---|---|
| 3,815,925 A | * | 6/1974 | Mattoon | 137/68.11 |
| 3,887,196 A | | 6/1975 | Renfrow | 277/2 |
| 4,099,562 A | | 7/1978 | Mattoon | 166/84 |
| 4,415,026 A | | 11/1983 | Rezewski et al. | 166/97 |
| 4,480,842 A | * | 11/1984 | Mahyera et al. | 277/329 |
| 4,579,350 A | * | 4/1986 | Knox | 277/322 |
| 4,889,184 A | | 12/1989 | Lugtmeier et al. | 166/80 |
| 5,112,140 A | * | 5/1992 | Cherny et al. | 384/16 |
| 5,343,944 A | | 9/1994 | Bassinger | 166/84 |

* cited by examiner

Primary Examiner—Anthony Knight
Assistant Examiner—John L. Beres
(74) Attorney, Agent, or Firm—Christensen O'Connor Johnson Kindness PLLC

(57) ABSTRACT

A self aligning stuffing box for pump jacks includes a first tubular body having an interior bore with internal stops. A second tubular body has a first end with a concave contact surface. The second tubular body is telescopically received within the first tubular body with the concave contact surface precluded from withdrawal by the internal stops. An annular body is received within the interior bore of the first tubular body. The annular body has a convex contact surface which engages the concave contact surface of the second tubular body. A third tubular body is received within the first tubular body and exerts a compressive force upon the annular body to maintain the convex contact surface engaged with the concave contact surface of the second tubular body during relative movement.

7 Claims, 3 Drawing Sheets

US 6,412,783 B1

SELF ALIGNING STUFFING BOX FOR PUMPJACKS

FIELD OF THE INVENTION

The present invention relates to a self aligning stuffing box for pumpjacks.

BACKGROUND OF THE INVENTION

The pumping action of a beam pump, commonly known as a "pumpjack", moves a polished rod in a reciprocating motion. The polished rod extends through an axial bore of a stuffing box. The stuffing box contains packing which forms a seal against the polished rod. If the polished rod is not axially aligned with the axial bore of the stuffing box, lateral pressure is exerted upon the stuffing box by the polished rod. This lateral pressure leads to wear and premature failure of both the packing and the polished rod.

In order to address problems of wear due to improper alignment, stuffing boxes have been developed that are self aligning. U.S. Pat. No. 3,887,196 (Renfrow) discloses a self aligning stuffing box in which a first body provides a socket and a second body provides a ball. The ball and socket engagement enables limited universal movement between the first body and the second body.

SUMMARY OF THE INVENTION

The present invention relates to an alternative configuration of self aligning stuffing box for pumpjacks.

According to the present invention there is provided a self aligning stuffing box for pumpjacks which includes a first tubular body having a first end, a second end, an exterior surface and an interior surface defining an interior bore. The interior surface at the second end has internal stops. A second tubular body is provided having a first end, a second end, an exterior surface and an interior surface defining an interior bore. The first end has a concave contact surface. The second tubular body is telescopically received within the first tubular body with the first end of the second tubular body precluded from withdrawal from the second end of the first tubular body by the internal stops. An annular body is disposed within the interior bore of the first tubular body. The annular body has a first end and a second end. The second end has a convex contact surface which engages the concave contact surface of the second tubular body. A third tubular body is provided having a first end, a second end, an exterior surface, and an interior surface defining an interior bore. The second end of the third tubular body is telescopically received in the first tubular body and exerts a compressive force upon the annular body to maintain the convex contact surface of the annular body engaged with the concave contact surface of the second tubular body. At least one tubular packing housing is provided having a first end, a second end, an exterior surface and an interior surface defining a packing chamber which is adapted to receive packing. Either the first end or the second end of the tubular packing housing is coupled to either the second end of the second tubular member or the first end of the third tubular member.

Although beneficial results may be obtained through the use of the self aligning stuffing box, as described above, even more beneficial results may be obtained when additional features are incorporated into the stuffing box. For example a fluid responsive flapper valve can be pivotally mounted within the interior bore of the stuffing box, such that upon removal of a polished rod from the interior bore, the flapper valve closes the interior bore-in response to fluid pressure.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
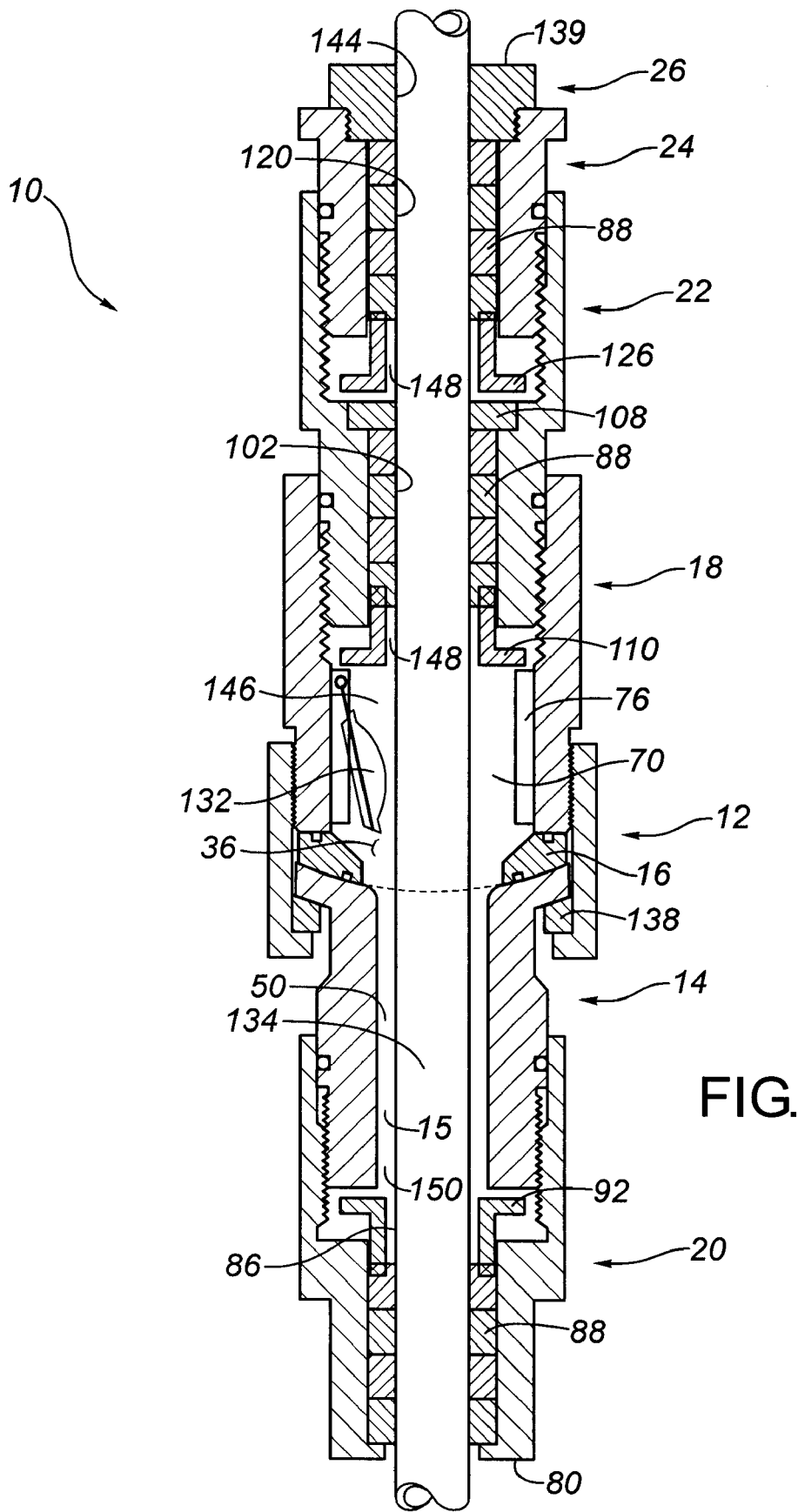
FIG. 1 is a side elevation view, in section, of a self aligning stuffing box for pumpjacks constructed in accordance with the teachings of the present invention, in a straight orientation.

The preferred embodiment, a self aligning stuffing box for pumpjacks generally identified by reference numeral 10, will now be described with reference to FIGS. 1 through 3.

Figure 3:
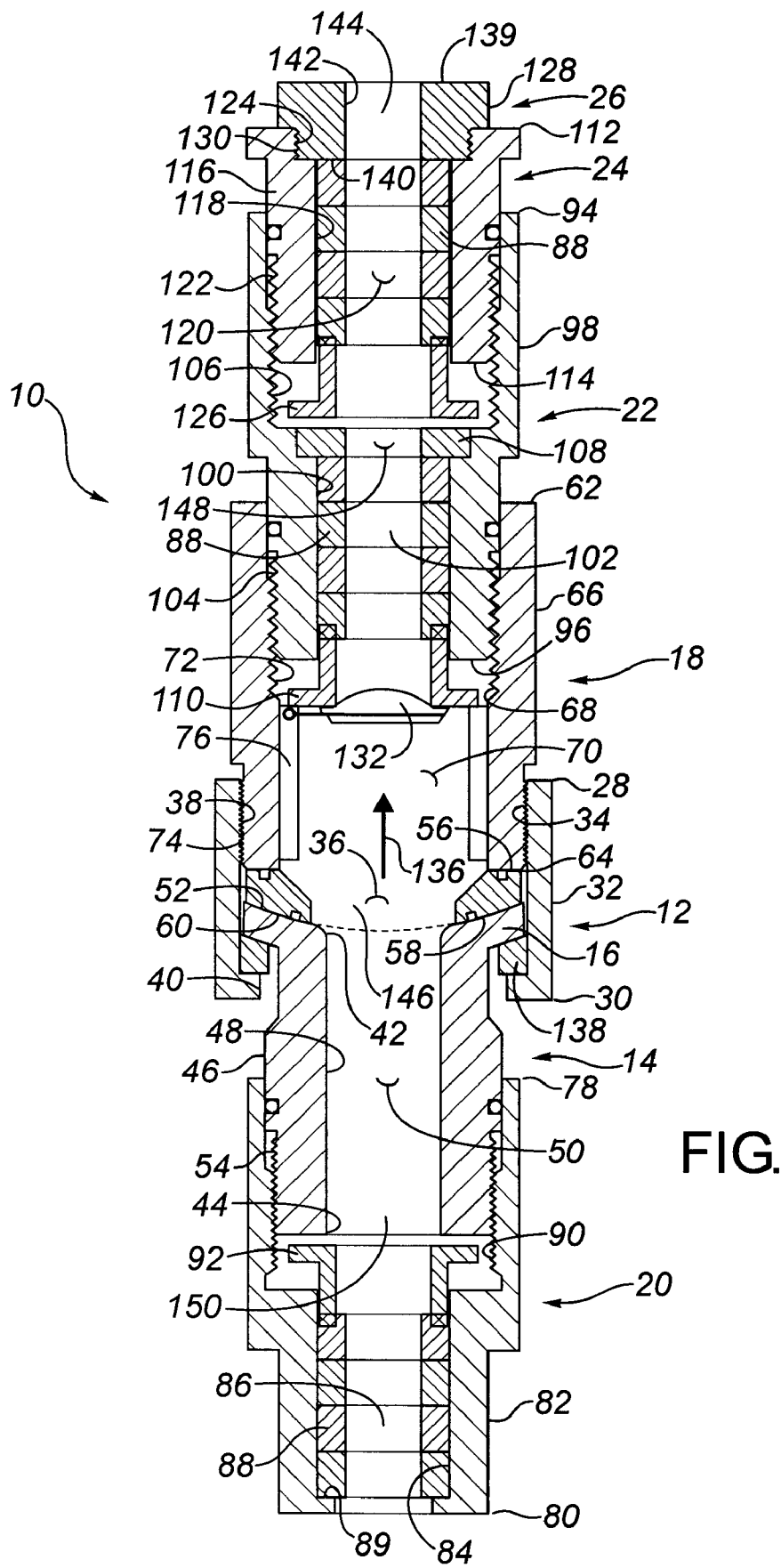
FIG. 3 is a side elevation view, in section, of the self aligning stuffing box for pumpjacks illustrated in FIG. 2, with polished rod removed.

Referring to FIG. 3, self aligning stuffing box 10 includes a first tubular body 12, a second tubular body 14, an annular body 16, a third tubular body 18, a primary tubular packing housing 20, a secondary tubular packing housing 22, a tertiary tubular packing housing 24, and an end cap 26.

First tubular body 12 has a first end 28, a second end 30, an exterior surface 32 and an interior surface 34 defining an interior bore 36. Interior surface 34 at first end 28 has internal coupling threads 38. Interior surface 34 at second end 30 has internal stops 40.

Second tubular body 14 has a first end 42, a second end 44, an exterior surface 46 and an interior surface 48 defining an interior bore 50. First end 42 of second tubular body 14 has a concave contact surface 52 that extends radially past first end 42. Second end 44 of second tubular body 14 has external coupling threads 54 on exterior surface 46. Second tubular body 14 is telescopically received within first tubular body 12 with first end 42 of second tubular body 14 precluded from withdrawal from second end 30 of first tubular body 12 by internal stops 40. A spacer ring 138 with an arcuate seating surface 141 is positioned between stops 40 at an interior surface 34 at second end 30 of first tubular body 12 and exterior surface 46 at first end 42 of second tubular body 14. Spacer ring 138 provides underlying support for concave contact surface 52.

Annular body 16 is disposed within interior bore 36 of first tubular body 14. Annular body 16 has a first end 56 and a second end 58. Second end 58 of annular body 16 has a convex contact surface 60 which engages concave contact surface 52 of second tubular body 14.

Third tubular body 18 has a first end 62, a second end 64, an exterior surface 66, and an interior surface 68 defining an interior bore 70. First end 62 of third tubular body 18 has internal coupling threads 72 on interior surface 68. Exterior surface 66 at second end 64 of third tubular body 18 has exterior coupling threads 74 adapted to engage interior coupling threads 38 at first end 28 of first tubular body 12. Third tubular body 18 exerts a compressive force upon annular body 16 to maintain convex contact surface 60 of annular body 16 engaged with concave contact surface 52 of second tubular body 14. Both first end 56 and second end 58 of annular body 16 have embedded seals 59 which assist in enabling annular body 16 to form a seal between second tubular body 14 and third tubular body 18. Third tubular body 18 has an intermediate annular shoulder 76 positioned between first end 62 and second end 64, the purpose of which will hereinafter be further described.

Primary tubular packing housing 20 has a first end 78, a second end 80, an exterior surface 82 and an interior surface 84 defining a packing chamber 86 which is adapted to receive packing 88. Packing chamber 86 has internal stops 89 positioned at second end 80 of primary tubular packing housing 20. For ease of manufacture and assembly internal stops 89 are made as a separate annular component which is held in place by snap rings. This also permits internal stops 89 to be removed to permit better access when removing packing. First end 78 of primary packing housing 20 has internal coupling threads 90 on interior surface 84 adapted to mate with external coupling threads 54 on exterior surface 46 at second end 44 of second tubular body 14. A primary packing compression sleeve 92 is disposed between second end 44 of second tubular body 14 and packing chamber 86 of primary packing housing 20. As internal coupling threads 90 on interior surface 84 of primary packing housing 20 engage external coupling threads 54 on exterior surface 46 of second tubular body 14, second end 44 of second tubular body 14 engages primary packing compression sleeve 92 to exert a compressive force upon packing 88 in packing chamber 86 of primary packing housing 20. Packing 88 is compressed between primary packing compression sleeve and internal stops 89.

Secondary tubular packing housing 22 has a first end 94, a second end 96, an exterior surface 98 and an interior surface 100 defining a packing chamber 102 which is adapted to receive packing 88. Second end 96 of secondary packing housing 22 has external coupling threads 104 on exterior surface 98 adapted to mate with internal coupling threads 72 at first end 62 of third tubular body 18. First end 94 of secondary packing housing 22 has internal coupling threads 106 on interior surface 100. An intermediate annular shoulder 108 is positioned between first end 94 and second end 96 of secondary packing housing 22. For ease of manufacture and assembly intermediate annular shoulder 108 is made as a separate annular component which is held in place by snap rings. This also permits intermediate annular shoulder 108 to be removed to permit better access when removing packing. A secondary packing compression sleeve 110 is disposed between intermediate annular shoulder 76 of third tubular body 18 and packing chamber 102 of secondary packing housing 22. As internal coupling threads 72 on interior surface 68 of third tubular member 18 engage external coupling threads 104 on exterior surface 98 of secondary packing housing 22, intermediate annular shoulder 76 of third tubular body 18 engages secondary packing compression sleeve 110 to exert a compressive force upon packing 88 in packing chamber 102 of secondary packing housing 22. Packing 88 is compressed between secondary packing compression sleeve 110 and intermediate annular shoulder 108.

Tertiary tubular packing housing 24 has a first end 112, a second end 114, an exterior surface 116 and an interior surface 118 defining a packing chamber 120 which is adapted to receive packing 88. Second end 114 of tertiary packing housing 24 has external coupling threads 122 on exterior surface 116 adapted to mate with internal coupling threads 106 of secondary packing housing 22. First end 112 of tertiary packing housing 24 has internal threads 124 on interior surface 118. A tertiary packing compression sleeve 126 is disposed between intermediate annular shoulder 108 of secondary packing housing 22 and packing chamber 120 of tertiary packing housing 24. As internal coupling threads 106 on interior surface 100 of secondary packing housing 22 engage external coupling threads 122 on exterior surface 116 of tertiary packing housing intermediate annular shoulder 108 of secondary packing housing 22 engages tertiary packing compression sleeve 126 to exert a compressive force upon packing 88 in packing chamber 120 of tertiary packing housing 24.

End cap 26 has a first end 139, a second end 140, an external surface 128 with exterior coupling threads 130, and an interior surface 142 defining an interior bore 144 between first end 139 and second end 140. External coupling threads 130 of end cap 26 are adapted to engage with interior coupling threads 124 on interior surface 118 of tertiary packing housing 24.

Interior bore 70 of third tubular body 18 defines a lubricant reservoir adapted to be filled with lubricant. A fluid responsive flapper valve 132 is pivotally mounted within interior bore 70 of third tubular body 18. Referring to FIGS. 1 through 3, flapper valve 132 has an open position illustrated in FIGS. 1 and 2 and a closed position illustrated in FIG. 3. Referring to FIGS. 1 and 2, when a polished rod 134 is positioned within interior bore 70 of third tubular member 18, flapper valve 132 is in the open position and polished rod 134 moves freely in a reciprocating manner axially within interior bore 70. Referring to FIG. 3, upon removal of polished rod 134 from interior bore 70, flapper valve 132 closes interior bore 70 in response to fluid pressure, indicated by arrow 136.

Figure 2:
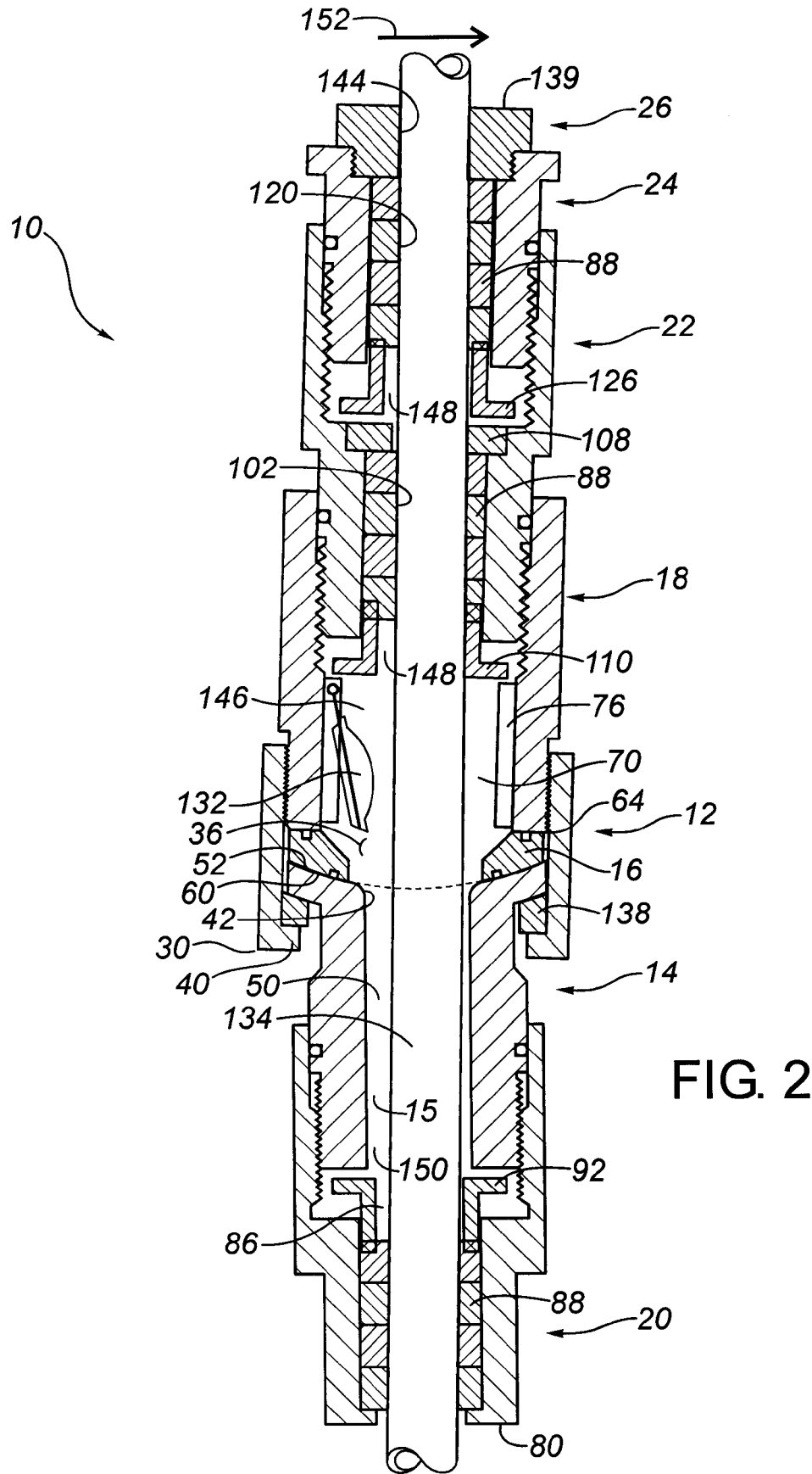
FIG. 2 is a side elevation view, in section, of the self aligning stuffing box for pumpjacks illustrated in FIG. 1, in an angular offset orientation.

Referring to FIG. 1, self aligning stuffing box for pumpjacks 10 has an axial bore 146 extending from first end 139 of end cap 26 to second end 80 of primary packing housing 20. Axial bore 146 has a first portion 148 comprising interior bore 144 of end cap 26, packing chamber 120 of tertiary packing housing 24, packing chamber 102 of secondary packing housing 22, and interior bore 70 of third tubular member 18, and a second portion 150 comprising interior bore 36 of first tubular member 12, interior bore 50 of second tubular member 14, and packing chamber 86 of primary packing housing 20. Packing 88 fits closely about polished rod 134 received within axial bore 146. First portion 148 and second portion 150 of axial bore 146 are coaxial when stuffing box 10 is straight.

During operation of stuffing box 10, primary packing housing 20 is mated to a wellhead (not shown), and is therefore held rigidly in place. Referring to FIG. 2, when polished rod 134 is not axially aligned within axial bore of stuffing box 10, lateral pressure is exerted upon stuffing box 10 by polished rod 134, as indicated by arrow 152. Said lateral pressure leads to wear and premature failure of both packing 88 and polished rod 134. Engagement between convex surface 60 of annular body 16 and concave surface 52 of second tubular body 14 allows for limited universal movement between annular body 16 and second tubular body 14. First portion 148 and second portion 150 of axial bore 146 are capable of limited relative angular displacement, thereby reducing or eliminating lateral pressure exerted upon stuffing box 10. Stuffing 88 deforms to maintain a seal between polished rod 134 and stuffing box 10. Convex surface 60 of annular body 16 can move relative to concave surface 52 of second tubular body 14 to correct misalignment in response to vibration or play of polished rod 134 within axially bore 146, thereby reducing the rate of wear of both packing 88 and polished rod 134. Annular body 16 accommodates angular displacement while maintaining a seal between first end 42 of second tubular body 14 and second end 64 of third tubular body 18. Spacer ring 138 is positioned between stops 40 at second end 30 of first tubular body 12 and first end 42 of second tubular body 14, and provides underlying support for concave contact surface 52.

It will be apparent to one skilled in that art that although stuffing box 10 has been shown in a particular orientation, it can also run in an inverted orientation. It will also be apparent to one skilled in the art that modifications maybe made to the illustrated embodiment without departing from the spirit and scope of the invention as hereinafter defined in the Claims.

The embodiments of the invention in which an exclusive property or privilege is claimed are defined as follows:

1. A self aligning stuffing box for pumpjacks, comprising:
   a first tubular body having a first end, a second end, an exterior surface and an interior surface defining an interior bore, the interior surface at the second end having internal stops;
   a second tubular body having a first end, a second end, an exterior surface and an interior surface defining an interior bore, the first end having a concave contact surface, the second tubular body being telescopically received within the first tubular body with the first end of the second tubular body precluded from withdrawal from the second end of the first tubular body by the internal stops;
   an annular body disposed within the interior bore of the first tubular body, the annular body having a first end and a second end, the second end having a convex contact surface which engages the concave contact surface of the second tubular body;
   a third tubular body having a first end, a second end, an exterior surface, and an interior surface defining an interior bore, the second end of the third tubular body being telescopically received in the first tubular body and exerting a compressive force upon the annular body to maintain the convex contact surface of the annular body engaged with the concave contact surface of the second tubular body;
   at least one tubular packing housing having a first end, a second end, an exterior surface and an interior surface defining a packing chamber which is adapted to receive packing, one of the first end and the second end of the tubular packing housing being coupled with one of the second end of the second tubular member and the first end of the third tubular member.

2. A self aligning stuffing box for pumpjacks, comprising:
   a first tubular body having a first end, a second end, an exterior surface and an interior surface defining an interior bore, the interior surface at the first end having internal coupling threads, the interior surface at the second end having internal stops;
   a second tubular body having a first end, a second end, an exterior surface and an interior surface defining an interior bore, the first end having a concave contact surface, the second end having one of internal coupling threads on the interior surface and external coupling threads on the exterior surface, the second tubular body being telescopically received within the first tubular body with the first end of the second tubular body precluded from withdrawal from the second end of the first tubular body by the internal stops;
   an annular body disposed within the interior bore of the first tubular body, the annular body having a first end and a second end, the second end having a convex contact surface which engages the concave contact surface of the second tubular body;
   a third tubular body having a first end, a second end, an exterior surface, and an interior surface defining an interior bore, the second end having one of internal coupling threads on the interior surface and external coupling, threads on the exterior surface, the exterior surface at the second end having exterior coupling threads adapted to engage the interior coupling threads of the first tubular body with second end of the third tubular body exerting a compressive force upon the annular body to maintain the convex contact surface of the annular body engaged with the concave contact surface of the second tubular body;
   a primary tubular packing housing having a first end, a second end, an exterior surface and an interior surface defining a packing chamber which is adapted to receive packing, the first end of the primary packing housing having one of internal coupling threads on the interior surface and external coupling threads on the exterior surface adapted to mate with the second tubular body; and
   a secondary tubular packing housing having a first end, a second end, an exterior surface and an interior surface defining a packing chamber which is adapted to receive packing, the second end of the first packing housing having one of internal coupling threads on the interior surface and external coupling threads on the exterior surface adapted to mate with the third tubular body.

3. The self aligning stuffing box as claimed in claim 2, wherein a primary packing compression sleeve is disposed between the second end of the second tubular body and the packing chamber of the primary packing housing.

4. The self aligning stuffing box as claimed in claim 2, wherein a secondary packing compression sleeve is disposed between the first end of the third tubular body and the packing chamber of the secondary packing housing.

5. The self aligning stuffing box as claimed in claim 2, wherein the interior bore of the third tubular body defines a lubricant reservoir adapted to be filled with lubricant.

6. The self aligning stuffing box as claimed in claim 2, wherein the interior bore of the third tubular body has positioned therein a pivotally mounted fluid responsive flapper valve such that upon removal of a polished rod from the interior bore, the flapper valve closes the interior bore in response to fluid pressure.

7. A self aligning stuffing box for pumpjacks, comprising:
   a first tubular body having a first end, a second end, an exterior surface and an interior surface defining an interior bore, the interior surface at the first end having internal coupling threads, the interior surface at the second end having internal stops;
   a second tubular body having a first end, a second end, an exterior surface and an interior surface defining an interior bore, the first end having a concave contact surface, the second end having external coupling threads on the exterior surface, the second tubular body being telescopically received within the first tubular body with the first end of the second tubular body precluded from withdrawal from the second end of the first tubular body by the internal stops;
   an annular body disposed within the interior bore of the first tubular body, the annular body having a first end and a second end, the second end having a convex contact surface which engages the concave contact surface of the second tubular body;
   a third tubular body having a first end, a second end, an exterior surface, and an interior surface defining an interior bore, the second end having internal coupling threads on the interior surface, the exterior surface at the second end having exterior coupling threads adapted to engage the interior coupling threads at the first end of the first tubular body, the third tubular body exerting a compressive force upon the annular body to maintain the convex contact surface of the annular body engaged with the concave contact surface of the second tubular body, the third tubular body having an intermediate annular shoulder positioned between the first end and the second end;

a primary tubular packing housing having a first end, a second end, an exterior surface and an interior surface defining a packing chamber which is adapted to receive packing, the first end of the primary packing housing internal coupling threads on the interior surface adapted to mate with external coupling threads on the exterior surface at the second end of the second tubular body;

a primary packing compression sleeve being disposed between the second end of the second tubular body and the packing chamber of the primary packing housing, such that as the internal coupling threads on the interior surface of the primary packing housing engage the external coupling threads on the exterior surface of the second tubular body the second end of the second tubular body engages the primary packing compression sleeve to exert a compressive force upon packing in the packing chamber of the primary packing housing;

a secondary tubular packing housing having a first end, a second end, an exterior surface and an interior surface defining a packing chamber which is adapted to receive packing, the second end of the secondary packing housing having external coupling threads on the exterior surface adapted to mate with the internal coupling threads at the first end of the third tubular body, the first end of the secondary packing housing having internal threads on the interior surface, and intermediate annular shoulder being positioned between the first end and the second end of the secondary packing housing;

a secondary packing compression sleeve being disposed between the intermediate annular shoulder of the third tubular body and the packing chamber of the secondary packing housing, such that as the internal coupling threads on the interior surface of the third tubular member engage the external coupling threads on the exterior surface of the secondary packing housing the intermediate annular shoulder of the third tubular body engages the secondary packing compression sleeve to exert a compressive force upon packing in the packing chamber of the secondary packing housing;

a tertiary tubular packing housing having a first end, a second end, an exterior surface and an interior surface defining a packing chamber which is adapted to receive packing, the second end of the secondary packing housing having external coupling threads on the exterior surface adapted to mate with the internal coupling threads at the first end of the secondary packing housing, the first end of the secondary packing housing having internal threads on the interior surface;

a tertiary packing compression sleeve being disposed between the intermediate annular shoulder of the secondary packing housing and the packing chamber of the tertiary packing housing, such that as the internal coupling threads on the interior surface of the secondary packing housing engage the external coupling threads on the exterior surface of the tertiary packing housing the intermediate annular shoulder of the third tubular body engages the tertiary packing compression sleeve to exert a compressive force upon packing in the packing chamber of the tertiary packing housing;

an end cap having an external surface with exterior coupling threads being engaged with the interior coupling threads on the interior surface of the tertiary packing housing; and the interior bore of the third tubular body defining a lubricant reservoir adapted to be filled with lubricant, a fluid responsive flapper valve being pivotally mounted within the interior bore of the third tubular body such that upon removal of a polished rod from the interior bore, the flapper valve closes the interior bore in response to fluid pressure.

* * * * *